(12) United States Patent
Yuan

(10) Patent No.: US 6,348,019 B1
(45) Date of Patent: Feb. 19, 2002

(54) DRIVE RING CVT BELT

(75) Inventor: Jing Yuan, Rochester Hills, MI (US)

(73) Assignee: The Gates Corporation, Denver, CO (US)

(*) Notice: Subject to any disclaimer, the term of this patent is extended or adjusted under 35 U.S.C. 154(b) by 0 days.

(21) Appl. No.: 09/527,012

(22) Filed: Mar. 16, 2000

(51) Int. Cl.$^7$ ............................................. F16H 55/56
(52) U.S. Cl. ............................................. 474/8; 474/46
(58) Field of Search ................... 474/8, 13, 30, 474/35, 54, 56, 48, 84, 85, 87, 177, 178, 179; 83/820; 475/185

(56) References Cited

U.S. PATENT DOCUMENTS

| | | | |
|---|---|---|---|
| 2,952,167 A | * 9/1960 | Nelson | 474/35 X |
| 3,234,806 A | 2/1966 | Maurer et al. | 74/230.17 |
| 3,590,649 A | 7/1971 | Fischer | 74/230.17 |
| 3,935,780 A | * 2/1976 | Hoffman | 83/820 |
| 4,631,042 A | * 12/1986 | Rattunde | 474/8 |
| 4,875,894 A | 10/1989 | Clark | 474/49 |
| 4,878,411 A | * 11/1989 | Laskowski et al. | 474/178 |
| 4,919,643 A | 4/1990 | Fuss et al. | 474/46 |
| 5,183,444 A | 2/1993 | Robbins | 475/210 |
| 5,709,624 A | 1/1998 | Donowski | 474/8 |
| 6,017,285 A | 1/2000 | Yasuhara et al. | 474/12 |
| 6,024,664 A | * 2/2000 | Shaffner | 475/185 |
| 6,248,035 B1 | * 6/2001 | Bartlett | 474/13 |

FOREIGN PATENT DOCUMENTS

| | | | |
|---|---|---|---|
| DE | 4226133 | * 8/1992 | |
| JP | 57/171447 | * 4/1956 | |

OTHER PUBLICATIONS

Tamagawa, Takao,Yasuhara,Shinji, and Hasuda, Yasuhiko "Continuously Variable Accessory Drive System (CVAD)".

* cited by examiner

Primary Examiner—Thomas R. Hannon
Assistant Examiner—Colby Hansen
(74) Attorney, Agent, or Firm—J. A. Thurnau, Esq.; C. H. Castleman, Esq.; S. G. Austin, Esq.

(57) ABSTRACT

The invention comprises a drive ring CVT belt. In a CVT transmission, each variable diameter pulley has a drive ring trained around the sheaves. Each drive ring may comprise any high modulus material such as plastic or metal. An endless flexible tensile member or belt is trained between the drive rings. Each drive ring further comprises a sleeve that is trained around an outer surface of each drive ring. Each sleeve slides in a bushing on its respective drive ring. The belt has a tensile load that presses each of the drive rings together on the sleeves. The relative arrangement of the axis of rotation of each drive ring is maintained by the contact between the sleeves and the drive rings. The effective diameter or radius of each pulley is adjusted by movement of each drive ring in each pulley. Movement of the pulley sheaves causes the axis of rotation of each drive ring to move eccentrically with respect to the axis of rotation of the pulley. As the rings move, the belt moves with the drive rings and remains trained over the drive rings, giving a constant bending radius to the belt. The drive rings each may have a surface profile for use with flat belts, synchronous belts, toothed belts, multi-ribbed belts or v type belts.

11 Claims, 3 Drawing Sheets

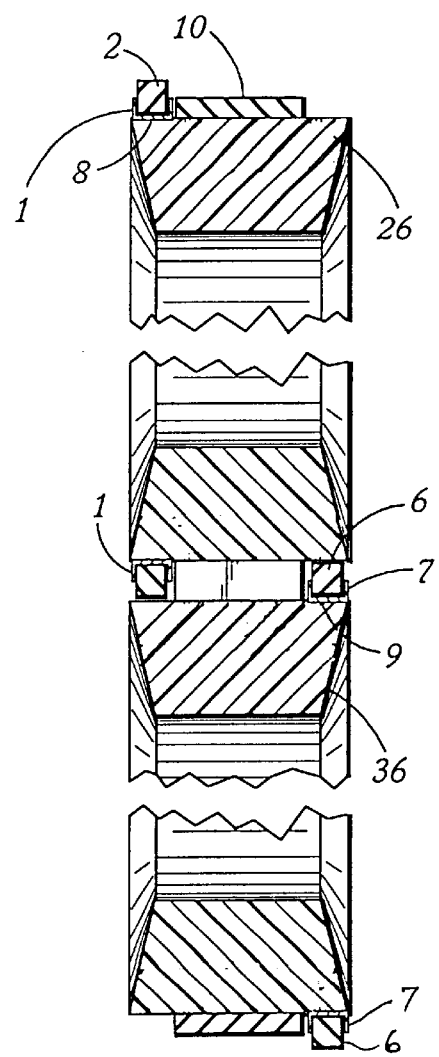
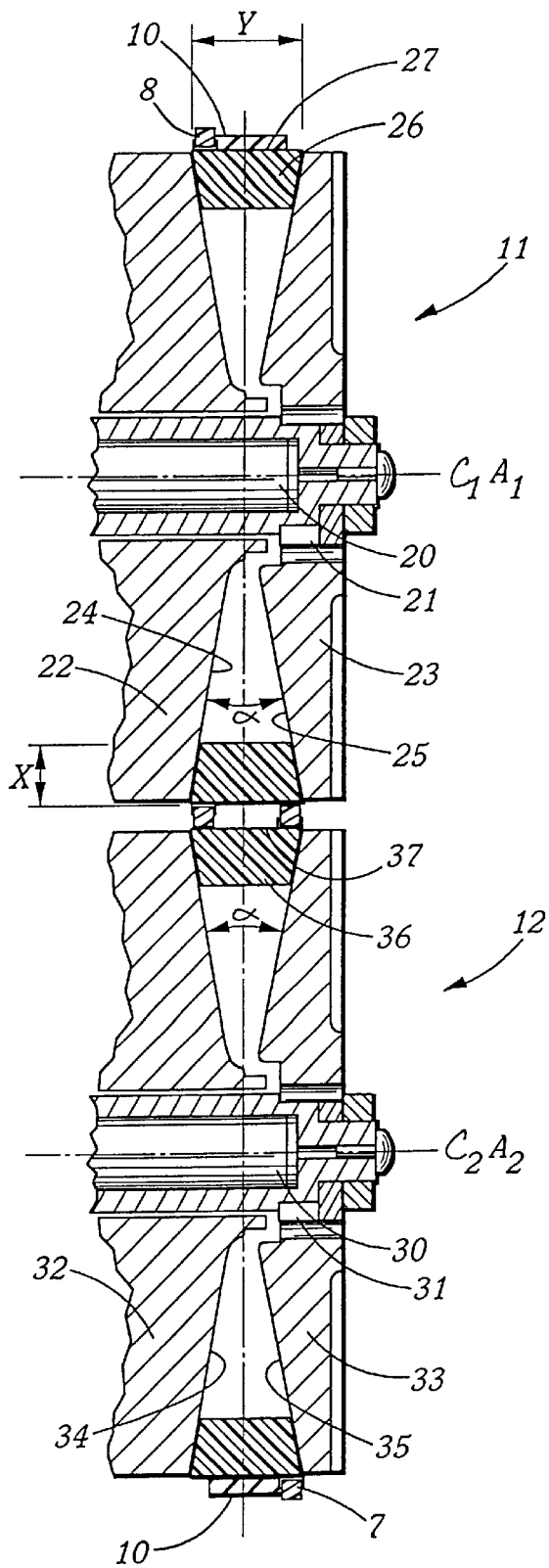
Figure 3
Figure 4

DRIVE RING CVT BELT

FIELD OF THE INVENTION

The invention relates to power transmission belts, and more particularly, to CVT belts comprising a belt trained on drive rings that cooperate with an input and output pulley.

BACKGROUND OF THE INVENTION

It is well known in the art that a gear type transmission may be used for running a motor vehicle, motorcycle or the like. For the purposes of improving fuel efficiency, a continuously variable transmission, CVT, is preferable. Various types of belts have been developed for use in continuously variable transmissions.

Generally, the CVT Belts have a silhouette similar to that of a conventional V-belt. In particular, they are broad at the top and narrow at the bottom and designed to fit between the sheaves of a pulley that define an angular groove. The pulley on which the belt is trained comprises a moveable sheave and a fixed sheave, both having a truncated cone shape. Generally, one of the sheaves moves while the other remains fixed.

Moving one sheave in relation to the other effectively varies the effective diameter $\phi$ of the pulley within which the belt operates. Consequently, belt speed is a function of the effective diameter of the pulley which is in turn a function of the axial position of the sheaves relative to each other. Generally two pulleys, an input and output, are present in a CVT transmission.

Although each of the prior art CVT belts are flexible, each also has characteristics not found in other power transmission belts. For example, the belts are required to have transverse rigidity. This allows the belt to run at a particular effective diameter without being crushed between the pulley sheaves. Consequently, each CVT belt system comprises a belt trained around variable diameter pulleys.

Regarding the prior art relationship between the pulley and the belt, U.S. Pat. No. 5,709,624 to Donowski discloses a variable diameter pulley. A single drive ring runs in the sheaves of the pulley. A flexible belt runs on the drive ring through the pulley. As the sheaves move with respect to each other, the effective diameter of the pulley is changed. Since the drive ring bears the transverse or compressive forces between the sheaves, the belt need not be designed to accommodate these forces. However, the Donowski device comprises a single drive ring used as a part of an auxiliary drive system of an internal combustion engine. A stabilizing member is also required to maintain the axis of rotation of the drive ring as least substantially parallel to the axis of rotation of the sheave members. The Donowski device does not lend itself to use in a CVT transmission.

Also representative of the prior art is U.S. Pat. No. 6,017,285 to Yasuhara, which discloses a variable diameter pulley with a power transmission ring held between the power transmission surfaces of the pulley. A belt is engaged with the outer circumference of the power transmission ring. The pulley bodies are biased toward each other with a biasing means, a belleville spring. The belleville spring couples the pulley bodies to each other for power transmission. This device requires a biasing means to realize power transmission from the pulley to the drive ring.

Also representative of the prior art is U.S. Pat. No. 4,875,894 to Clark, which discloses a continuously variable transmission. The transmission comprises an input and output shaft, each having a rotary disk assembly. The rotary disk assemblies each have contact pads which form circles having continuously variable diameters. The two rotary disk assemblies are connected by a coupling mechanism, such as a rigid coupling ring. Power transmission occurs between each pulley through rotation of the ring. This device does not offer the option of using flexible belts for power transmission, requiring instead the rigid ring to connect the two disks. This limits the space that the device can operate within, generally to a square or circular space defined by the extreme outer dimension of the pulleys.

What is needed is a drive ring CVT belt having cooperating drive rings. What is needed is a drive ring CVT belt having a flexible member trained around the pulley drive rings. What is needed is a drive ring CVT belt having drive ring alignment sleeves. The present invention meets these needs.

SUMMARY OF THE INVENTION

The primary aspect of the invention is to provide a drive ring CVT belt having cooperating drive rings.

Another aspect of the invention is to provide a drive ring CVT belt having a flexible member trained around the drive rings.

Another aspect of the invention is to provide a drive ring CVT belt having a constant belt loading radius.

Another aspect of the invention is to provide a drive ring CVT belt having drive ring alignment sleeves.

Other aspects of the invention will be pointed out or made obvious by the following description of the invention and the accompanying drawings.

The invention comprises a drive ring CVT belt. In a CVT transmission, each variable diameter pulley has a drive ring trained around the sheaves. Each drive ring may comprise any high modulus material such as plastic or metal. An endless flexible tensile member or belt is trained between the drive rings. Each drive ring further comprises a sleeve that is trained around an alternate outer surface of each drive ring. Each sleeve then slides in a bushing on its respective drive ring. The belt has a tensile load that presses each of the drive rings together on the sleeves. The relative arrangement of the axis of rotation of each drive ring is maintained by the contact between the sleeves and the drive rings. The effective diameter or radius of each pulley is adjusted by movement of the pulley sheaves. Movement of the pulley sheaves causes the axis of rotation of each drive ring to move eccentrically with respect to the axis of rotation of the pulley. As the rings move, the belt moves with the drive rings and remains trained over the drive rings, giving a constant bending radius to the belt. The drive rings each may have a surface profile for use with synchronous belts, toothed belts, multi-ribbed belts or v type belts.

BRIEF DESCRIPTION OF THE DRAWINGS

FIG. 3 is a cross-sectional view of a drive system.

FIG. 4 is a cross-sectional view of the rings and the guide bushings.

DETAILED DESCRIPTION OF THE PREFERRED EMBODIMENT

Figure 1:
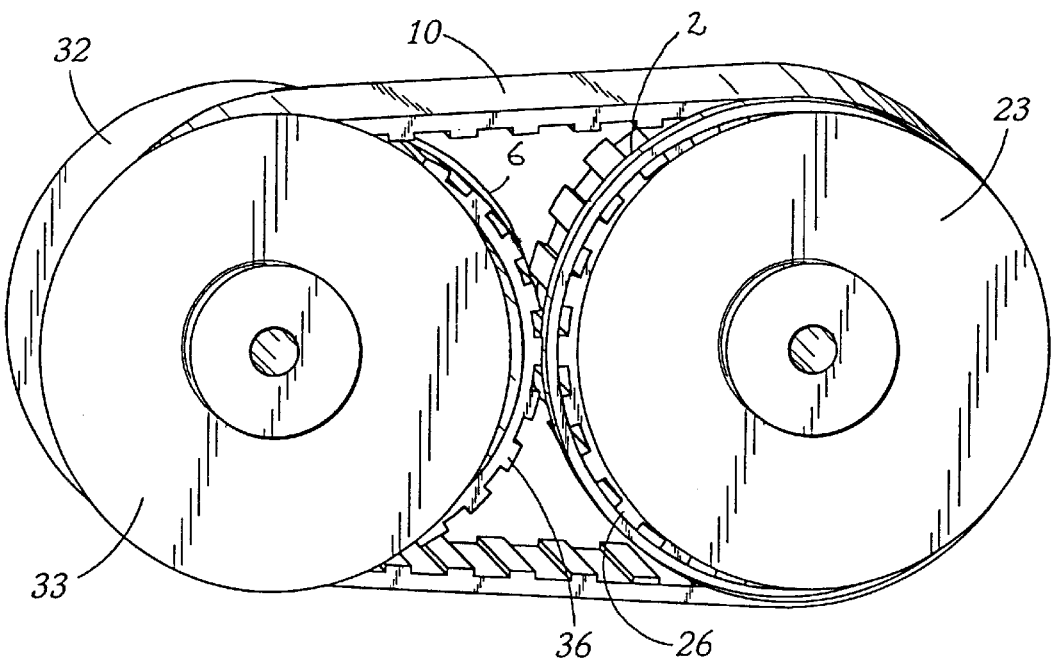
FIG. 1 is a perspective view of the invention.

FIG. 1 is a perspective view of the invention. Endless flexible tensile member 10, or belt, is trained around first drive ring 26 and second drive ring 36. First drive ring 26 rotates between sheave sections 23 and 22 (not shown). Second drive ring 36 rotates between sheave sections 32, 33. Belt 10 is shown in the preferred embodiment with a toothed profile, although any profile including a flat, multi-ribbed, or v-belt profile will work as well. Each of the drive rings may also have a conjugate profile that cooperates with the profile of the belt.

Each drive ring eccentrically rotates within its respective pulley. The position of each drive ring is determined by the distance between each of the sheaves on the particular pulley. For example, as the sheave sections 22, 23 move closer together, an axis of rotation $A_1$ of a drive ring 26 will move laterally toward the axis of rotation of the pulley $C_1$, and as sheave sections 32, 33 move apart, an axis of rotation $A_2$ of drive ring 36 will move laterally away from the axis of rotation of the pulley $C_2$, see FIG. 2. The radius of each drive ring is not limited to a value equal to the radius of its respective pulley, however, in the preferred embodiment the radius of the drive ring is slightly greater than the radius of its respective pulley.

Each drive ring may comprise any material having sufficient compressive strength known in the art, including metallic, and non-metallic materials such as phenolic or plastic materials. It is preferred that the drive ring material has a coefficient of friction and noise characteristics compatible with those of the pulley sheave surface, see FIG. 3 items 24, 25 and 34, 35.

This invention permits the bending radius of belt 10 to be constant as the belt tracks over each drive ring. The belt bending radius is slightly larger than the radius of the drive ring. Contrary to other CVT designs that cause chordal between small adjacent belt blocks, this invention allows the belt to maintain an relatively large constant radius as it tracks around each drive ring/pulley combination. This increases belt life by reducing belt failures caused by chordal or flex fatigue.

Figure 2:
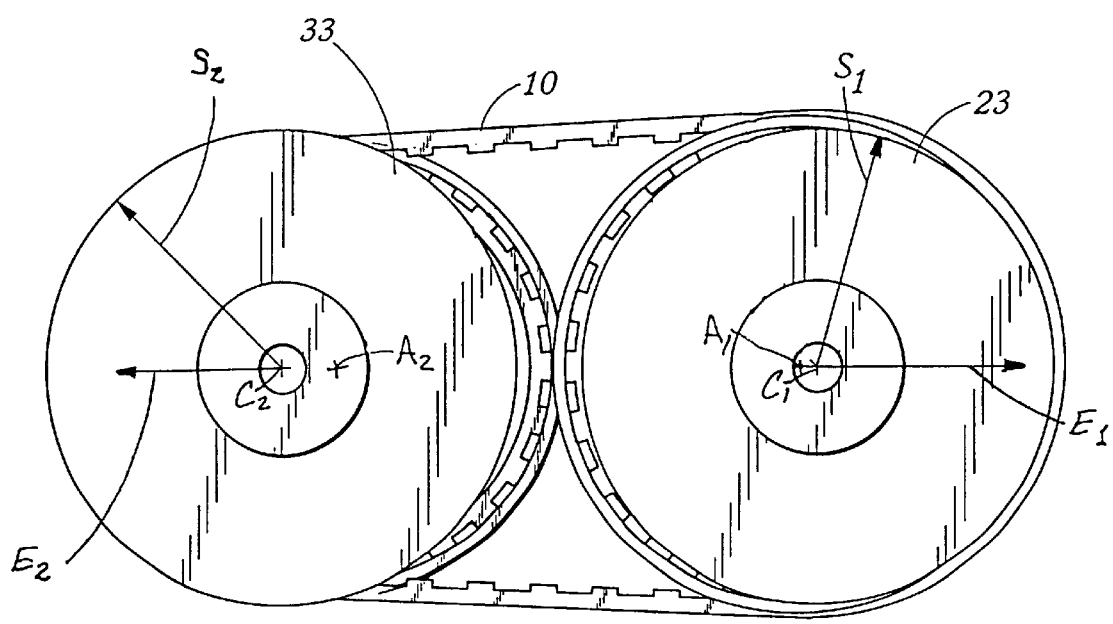
FIG. 2 is a side elevation view of the belt in the CVT pulleys.

FIG. 2 is a side elevation view of the belt in the CVT pulleys. Sheave sections 32, 33 are on the driver pulley. Sheave sections 22, 23 are on the driven pulley. In this view, sheave sections 22, 23 are relatively close together and sheave sections 32,33 are somewhat farther apart. The radius of sheave section 23 is $S_1$. The radius of sheave section 33 is $S_2$. Effective radius $E_1$ is the distance from the center of rotation $C_1$ to where drive ring 26 contacts sheave sections 22,23. Effective radius $E_2$ is the distance from the center of rotation $C_2$ to where drive ring 36 contacts sheave sections 32,33. Consequently, effective radius $E_1$ which is greater than effective radius $E_2$. It is known in the art that the ratio of $E_1$ to $E_2$ determines the gear ratio of the transmission. It is also know that $E_1$ and $E_2$ vary according to the position of the CVT driver pulley and driven pulley sheave sections.

FIG. 3 is a cross-sectional view of a drive system. Belt 10 is trained between pulley 11 and pulley 12. In particular, drive ring 26 is trained in pulley 11 and drive ring 36 is trained in pulley 12. Drive ring 26 and drive ring 36 are depicted with the flat belt profile. As noted in FIG. 1, the drive rings may have any one of a variety of profiles, depending on the needs of a user. Belt 10 is trained over drive ring 26 and over drive ring 36. Inclined sides of drive ring 26 bears on sheave surfaces 24, 25. Inclined sides of drive ring 36 bears on sheave surfaces 34, 35. In this view, the axis of rotation $A_1$ of drive ring 26 is substantially coaxial with the axis of rotation C, of pulley 11. The axis of rotation $A_2$ of drive ring 36 is substantially coaxial with the axis of rotation $C_2$ of pulley 12. However, the relationship between the axis of rotation of a given drive ring and the axis of rotation of a given pulley is variable according to the preceding description.

In operation, drive ring 26 will only contact the sheave surfaces on a particular pulley along a contact area that substantially describes a radial line. The same is true for the contact between drive ring 36 and sheave section 32, 33 surfaces. This is caused by the geometry of the eccentric relationship between the drive ring axis and the pulley axis. Since the contact area or line between the drive ring and the pulley is relatively small, the opportunity for the generation of heat is reduced. Further, since the power transmission contact is between the drive ring and the sheaves instead of between the flexible belt and the sheaves, belt failures caused by excessive heating and friction are reduced significantly.

The cross-section of drive rings 26, 36 has a height X and width Y to provide a profile. The profile has a width to height (X/Y) ratio in the range of 1 to 3. However, any ratio that prevents skewing of the drive ring axis in the pulley is acceptable. Referring to FIG. 3, each drive ring also describes an included angle α in the range of 20° to 70°. The geometry of the drive ring, and the described ratio causes a self tracking and self aligning feature where the position of the drive ring relative to the pulley is a function of the height, thereby causing the drive ring to move to the smallest effective radius while the drive ring is forced into a position where its axis of rotation is parallel with the axis of rotation of the pulley. This is caused by the wedge effect between the sides of the drive ring and the sheaves.

FIG. 4 is a partial cross-sectional view of the rings and the guide bushings. In the preferred embodiment, proper alignment of the drive rings during operation is maintained by a combination of bushings and sleeves. The bushings and sleeves comprise a sliding engagement that maintains a proper axial alignment of the drive rings. Bushing 1 is fixedly attached to an outer periphery of drive ring 26 in groove 8. Bushing 7 is fixedly attached to an outer periphery of drive ring 36 in groove 9 in a position that is non-coincidental with bushing 1. Grooves 8, 9 may be excluded whereby the bushing is mounted directly to the outer surface of the drive ring, as shown in FIG. 1 and according to the needs of a user. Sleeve 2 slidingly engages bushing 1 and is in contact with an outer surface of drive ring 36. Sleeve 6 slidingly engages bushing 7 and is in contact with an outer surface of drive ring 26. Sleeves 2, 6 can comprise rubber, elastomeric material or any other material having similar frictional characteristics known in the art. The drive rings are pressed together on sleeves 2, 6 by an amount equal to the tension or load on belt 10. Bushings 1, 7 may comprise Delrin™ or any other similar bushing material that comprises a low friction interface between the bushing and the sleeve, thereby facilitating sliding of the sleeves in the bushings. The bushings may be split to facilitate assembly on each ring.

Since sleeve 2 is in a loaded or pressed contact with drive ring 36, as drive ring 36 rotates, sleeve 2 turns is the direction opposite that of drive ring 36. Consequently, as drive ring 26 rotates, sleeve 2 slides in bushing 1. Sleeve 6 is also in a loaded or pressed contact with drive ring 26. As drive ring 26 rotates, sleeve 6 turns is the direction opposite that of drive ring 26. Consequently, as drive ring 36 rotates, sleeve 6 slides in bushing 7. Due to the low friction between sleeve 2 and bushing 1, sleeve 2 rotates in the opposite direction of drive ring 26. Due to the low friction between sleeve 6 and bushing 7, sleeve 6 rotates in the opposite direction of drive ring 36. The contact between the sleeves and the rings prevents the rings from becoming mis-aligned during operation.

Since the rotational axes of the drive rings 26, 36 translate in unison as the drive ring CVT belt operates, the relative spacing between the rings does not change, since each rubber sleeve remains in the proper spatial relationship to its corresponding bushing. This prevents drive rings 26, 36 from experiencing any lateral movement that would cause misalignment of the drive ring axes.

Figure 5:
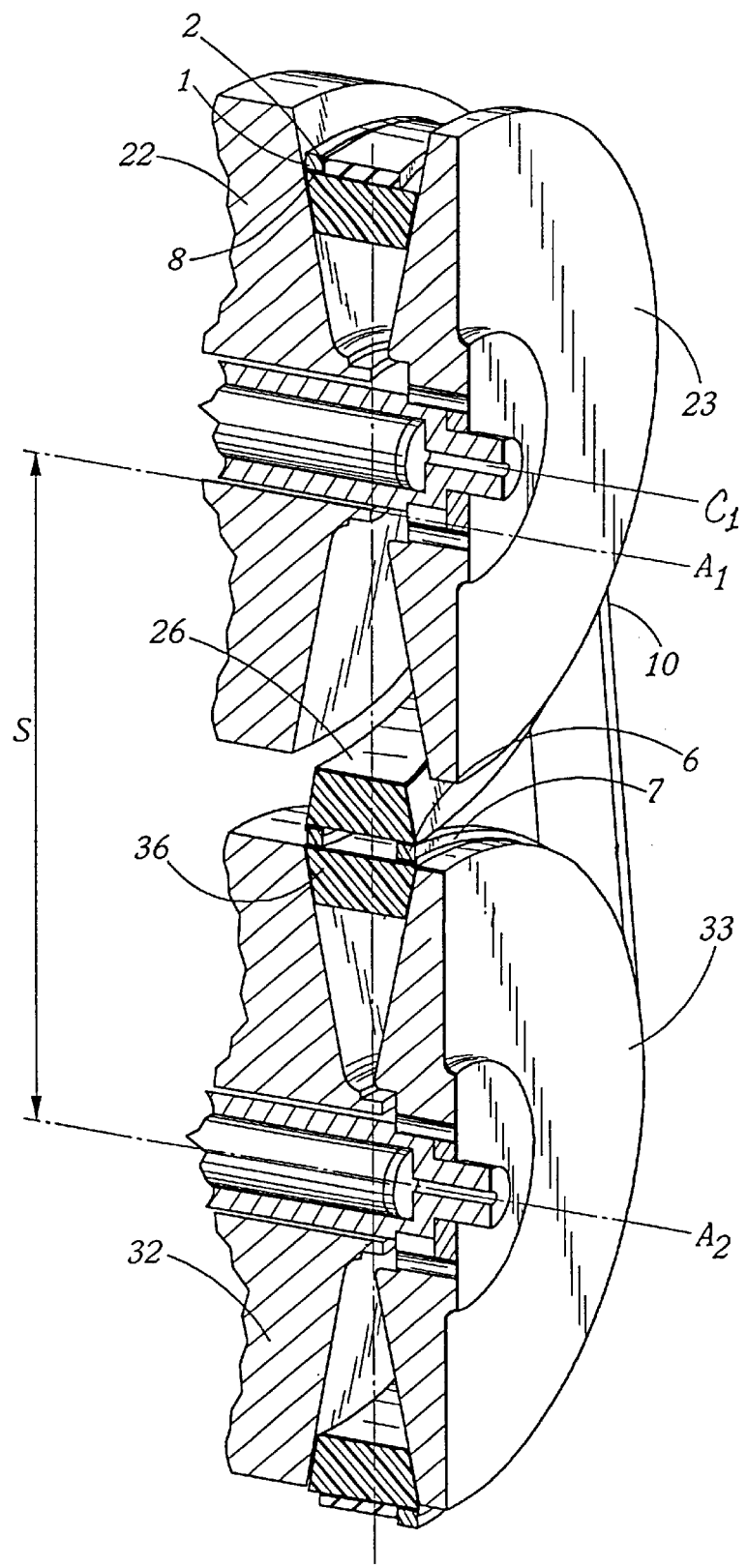
FIG. 5 is a perspective cross-sectional view of the invention.

FIG. 5 is a perspective cross-sectional view of the invention. Belt 10 is shown trained around drive ring 26 and drive ring 36. The relative arrangement of sleeves 2, 6 on opposing sides of the outer surface of each drive ring is shown. Sleeves 2, 6 may also be arranged as shown in FIG. 1, again, so long as they are on opposing sides of the drive rings. Belt 10 is shown trained between each drive ring 26, 36. The drive rings 26, 36 are pressed together on the sleeves 2, 6 by belt tension. FIG. 5 depicts the center of rotation $A_1$ of drive ring 26 eccentrically located from the center of rotation $C_1$ of sheave sections 22, 23.

In operation, the centers of rotation $A_1$, $A_2$ of drive rings 26, 36 and belt 10 move in unison as the relative spacing of sheave sections 22, 23 and sheave sections 32, 33 is changed by an operator. CVT transmissions and controls for operating the pulley sheaves are known in the art. The axis of rotation $A_1$ of drive ring 26 and the axis of rotation $A_2$ of drive ring 36 maintain a constant spacing S throughout the entire range of axial motion of the sheave sections. The speed of a drive ring on a driven pulley is a function of the location of the axis of rotation of the drive ring as compared to the axis of rotation of the driven pulley, as described in FIG. 2.

Although a single form of the invention has been described herein, it will be obvious to those skilled in the art that variations may be made in the construction and relation of parts without departing from the spirit and scope of the invention described herein.

I claim:

1. A drive ring CVT belt comprising:

a first drive ring;

a second drive ring;

an endless flexible drive element trained between the first drive ring and the second drive ring on an outer surface of the first drive ring and an outer surface of the second drive ring;

the first drive ring capable of cooperating with a first variable diameter pulley having sheaves, wherein the sheaves of said first variable diameter pulley are axially moveable with respect to each other; and the second drive ring capable of cooperating with a second variable diameter pulley having sheaves, wherein the sheaves of said second variable diameter pulley are axially moveable with respect to each other a first sleeve trained around the outer surface of the first drive ring, the first sleeve having a sliding engagement with the first drive ring and a non-sliding engagement with the second drive ring; and a second sleeve trained around the outer surface of the second drive ring, the second sleeve having a sliding engagement with the second drive ring and a non-sliding engagement with the first drive ring.

2. The drive ring CVT belt as in claim 1 further comprising:

a first bushing between the first sleeve and the first drive ring, the first sleeve having a sliding engagement with the first bushing; and a second bushing between the second sleeve and the second drive ring, the second sleeve having a sliding engagement with the second bushing.

3. The drive ring CVT belt as in claim 2, wherein the endless flexible drive element has a tensile load.

4. The drive ring CVT belt as in claim 2, wherein:

the first sleeve and the second sleeve each comprise a high friction material.

5. The drive ring CVT belt as in claim 4, wherein:

the first and second bushingach comprise a low friction material.

6. The drive ring CVT belt as in claim 1, wherein:

a profile of the endless flexible drive element describes a multi-ribbed profile;

the outer surface of the first drive ring describes a multi-ribbed profile; and the outer surface of the second drive ring describes a multi-ribbed profile.

7. The drive ring CVT belt as in claim 1, wherein:

a profile of the endless flexible drive element describes a toothed profile;

the outer surface of the first drive ring describes a toothed profile; and the outer surface of the second drive ring describes a toothed profile.

8. The drive ring CVT belt as in claim 1, wherein:

a profile of the endless flexible drive element describes a v-belt profile;

the outer surface of the first drive ring describes a v-belt profile; and the outer surface of the second drive ring describes a v-belt profile.

9. The drive ring CVT belt as in claim 1, wherein the first drive ring and the second drive ring each further-comprise:

a height X and a width Y having a ratio X/Y, wherein the ratio is approximately in the range of 1 to 3.

10. The drive ring CVT belt as in claim 1, wherein:

an inner surface of the endless flexible drive element describes a first profile;

an outer surface of the first drive ring describes a conjugate profile cooperating with said first profile; and an outer surface of the second drive ring describes a conjugate profile cooperating with said first profile.

11. The drive ring CVT as in claim 1, wherein each drive ring further comprises a:

non-metallic material.

\* \* \* \* \*